(12) United States Patent
Frankel et al.

(10) Patent No.: US 6,980,738 B1
(45) Date of Patent: Dec. 27, 2005

(54) METHOD AND SYSTEM FOR PROVIDING TUNABLE DISPERSION COMPENSATION

(75) Inventors: Michael Y. Frankel, Baltimore, MD (US); Victor Mizrahi, Annapolis, MD (US)

(73) Assignee: Ciena Corporation, Linthicum, MD (US)

( * ) Notice: Subject to any disclaimer, the term of this patent is extended or adjusted under 35 U.S.C. 154(b) by 635 days.

(21) Appl. No.: 09/821,422

(22) Filed: Mar. 29, 2001

Related U.S. Application Data

(60) Provisional application No. 60/264,335, filed on Jan. 26, 2001.

(51) Int. Cl.[7] ............................................. H04B 10/08
(52) U.S. Cl. .......................... 398/31; 398/29; 398/30; 398/81; 398/147; 398/148; 398/159
(58) Field of Search ........................... 398/9, 123, 147, 398/158, 81, 98, 30–33, 88, 28, 29, 148, 398/159; 359/337

(56) References Cited

U.S. PATENT DOCUMENTS

| | | | | |
|---|---|---|---|---|
| 4,953,939 A | 9/1990 | Epworth | ...................... | 350/96 |
| 5,035,481 A | 7/1991 | Mollenauer | .................. | 350/96 |
| 5,261,016 A | 11/1993 | Poole | | |
| 5,570,439 A | 10/1996 | Ido et al. | ...................... | 385/37 |
| 5,715,265 A | 2/1998 | Epsworth | ...................... | 372/38 |
| 6,081,360 A | 6/2000 | Ishikawa et al. | | |
| 6,108,470 A | 8/2000 | Jin et al. | | |
| 6,148,127 A | 11/2000 | Adams et al. | | |
| 6,160,659 A * | 12/2000 | Kinoshita | ................... | 359/337 |
| 6,204,944 B1 * | 3/2001 | Uchiyama et al. | ............ | 398/79 |
| 6,275,629 B1 | 8/2001 | Eggleton et al. | .............. | 385/37 |
| 6,292,601 B1 | 9/2001 | Laming et al. | ................ | 385/24 |
| 6,307,988 B1 | 10/2001 | Eggleton et al. | .............. | 385/37 |
| 6,313,932 B1 * | 11/2001 | Roberts et al. | ................ | 398/9 |
| 6,330,383 B1 | 12/2001 | Cai et al. | ...................... | 385/37 |
| 6,339,663 B1 * | 1/2002 | Leng et al. | ................... | 385/24 |
| 6,574,404 B2 * | 6/2003 | Sasaoka et al. | ............. | 385/123 |
| 6,587,242 B1 * | 7/2003 | Shake et al. | .................. | 398/98 |
| 2002/0048062 A1 * | 4/2002 | Sakamoto et al. | ........... | 359/124 |

OTHER PUBLICATIONS

Kato, et al. "Temperature Dependence of Chromatic Dispersion in Various Types of Optical Fibers", OFC 2000, 104/TuG7-1-TuGy-3.

* cited by examiner

*Primary Examiner*—David C. Payne
(74) *Attorney, Agent, or Firm*—Dougherty Clements; Christopher L. Bernard; Tyler S. Brown

(57) ABSTRACT

An exemplary embodiment of the invention is a dispersion compensation module for compensating dispersion in a communications network. The dispersion compensation module includes dispersion compensating fiber having a dispersion coefficient that varies with wavelength. A thermal regulator adjusts the temperature of the dispersion compensating fiber to adjust the dispersion characteristic of the dispersion compensating fiber. Alternate embodiments of the invention include a communications system using the dispersion compensation module and a method for compensating dispersion.

21 Claims, 7 Drawing Sheets

METHOD AND SYSTEM FOR PROVIDING TUNABLE DISPERSION COMPENSATION

CROSS REFERENCE TO RELATED APPLICATION

The present application claims the benefit under 35 U.S.C. § 119(e) of the filing date of U.S. Provisional Application Ser. No. 60/264,335, filed Jan. 26, 2001, the teachings of which are incorporated herein by reference.

BACKGROUND OF THE INVENTION

1. Field of Invention

The invention relates generally to a method and system for providing tunable dispersion compensation.

2. Description of Related Art

Dispersion is a known phenomenon in optical networks that causes a broadening of optical pulses along the length of the fiber. One type of dispersion relevant to the present invention is chromatic dispersion (also referred to as "material dispersion" or "intramodal dispersion"), caused by a differential delay of various wavelengths of light in a waveguide material.

The spectrum associated with a transmitted optical signal is subject to modulation-induced broadening, which increases linearly with bit rate. At the same time, the bit period decreases linearly with increasing bitrate. These two effects combined produce a quadratic scaling of signal intolerance to dispersion with increasing bitrate. Accordingly, for example, a 10 Gbps signal is 16 times less tolerant to dispersion than 2.5 Gbps signal, but only 4 times the bit rate.

Dispersion accumulates linearly with propagation distance in the fiber. Without compensation, typical propagation distances in standard single-mode fiber (e.g., SMF-28 or equivalent) are ~1000 km at 2.5 Gbps, 60 km at 10 Gbps, and only ~4 km at 40 Gbps. Clearly, some form of dispersion compensation is required to obtain substantial propagation distances at bit rates of 10 Gbps and above.

Moreover, fiber-optic system transport capacity has been increasing through combining multiple, separately modulated optical carriers at distinct wavelengths onto a single fiber. This technique is known as wavelength-division multiplexing (WDM). Due to WDM, it is preferable that dispersion compensation be performed for multiple wavelengths using a common device.

Several methods have been proposed to compensate for dispersion, including fiber Bragg gratings, optical all-pass interference filters, and dispersion compensating fiber. Dispersion compensating fiber (DCF) has found widespread practical acceptance and deployment due to its numerous advantages. Such advantages include relatively low loss as well as cost and ability to provide dispersion compensation across a broad range of wavelengths.

Fiber carrying optical signals in the 1550 nm communication window often has a positive dispersion, which can be offset or compensated with DCF having an associated negative dispersion, i.e. a negative dispersion coefficient. The length of DCF is selected so that the product of dispersion coefficient and length of DCF equals, in magnitude, the product of dispersion coefficient and length of transmission fiber. In which case, the DCF fully compensates the dispersion incurred by the transmitted optical signals. It may also be desirable to provide dispersion compensation that does not entirely compensate for dispersion in the transmission fiber, which may be useful for addressing certain nonlinear effects of signal propagation.

As a practical matter, the dispersion coefficient associated with DCF is typically greater in magnitude than the dispersion coefficient of the transmission fiber for which it compensates. Accordingly, the length of DCF used in conventional transmission systems is often shorter than the transmission fiber length.

A drawback to the DCF compensation schemes described above is that DCF lengths must be altered to if the length of transmission fiber is changed in order to provide the same amount of compensation. Moreover, if the dispersion associated with the transmission fiber and/or the DCF changes (e.g., due to environmental factors such as temperature), the DCF no longer provides full compensation. Thus, there is a need in the art for a tunable dispersion compensation system in which the dispersion associated with DCF can be altered.

SUMMARY OF THE INVENTION

An exemplary embodiment of the invention is a dispersion compensation device for compensating dispersion in a communications network. The dispersion compensation device includes dispersion compensating fiber, and a thermal regulator coupled to the dispersion compensating fiber. The thermal regulator is configured to adjust a temperature of the segment of dispersion compensating fiber to thereby change a dispersion coefficient function associated with the segment of dispersion compensating fiber.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

Figure 1:
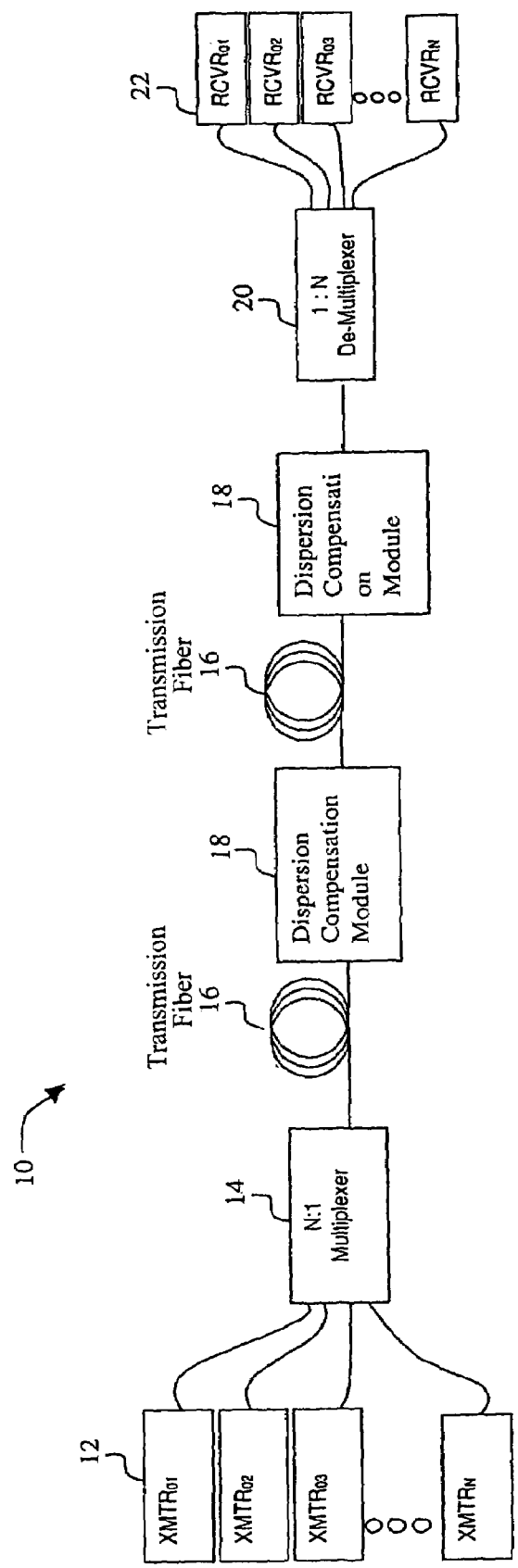
FIG. 1 is a block diagram of a communications system in an embodiment of the invention.

FIG. 1 depicts an optical communications network 10 in an exemplary embodiment of the invention. The network 10 includes a number of transmitters 12, each generating data on an optical wavelength for transmission over the network. The transmitters 12 optically communicate with an optical multiplexer 14 that combines the individual signals into a multiplexed signal. The multiplexed signal is optically communicated to transmission fiber 16. In the preferred embodiment, the transmission fiber 16 is non-dispersion shifted fiber (NDSF). Dispersion compensation modules 18, to be described in greater detail below, are in optical communication with transmission fiber 16 and are associated with pre-determined lengths of the transmission fiber 16. A demultiplexer 20 in optical communication with the transmission fiber 16 demultiplexes the multiplexed signal and directs each optical carrier to an appropriate receiver 22 designated for a particular wavelength.

Figure 2:
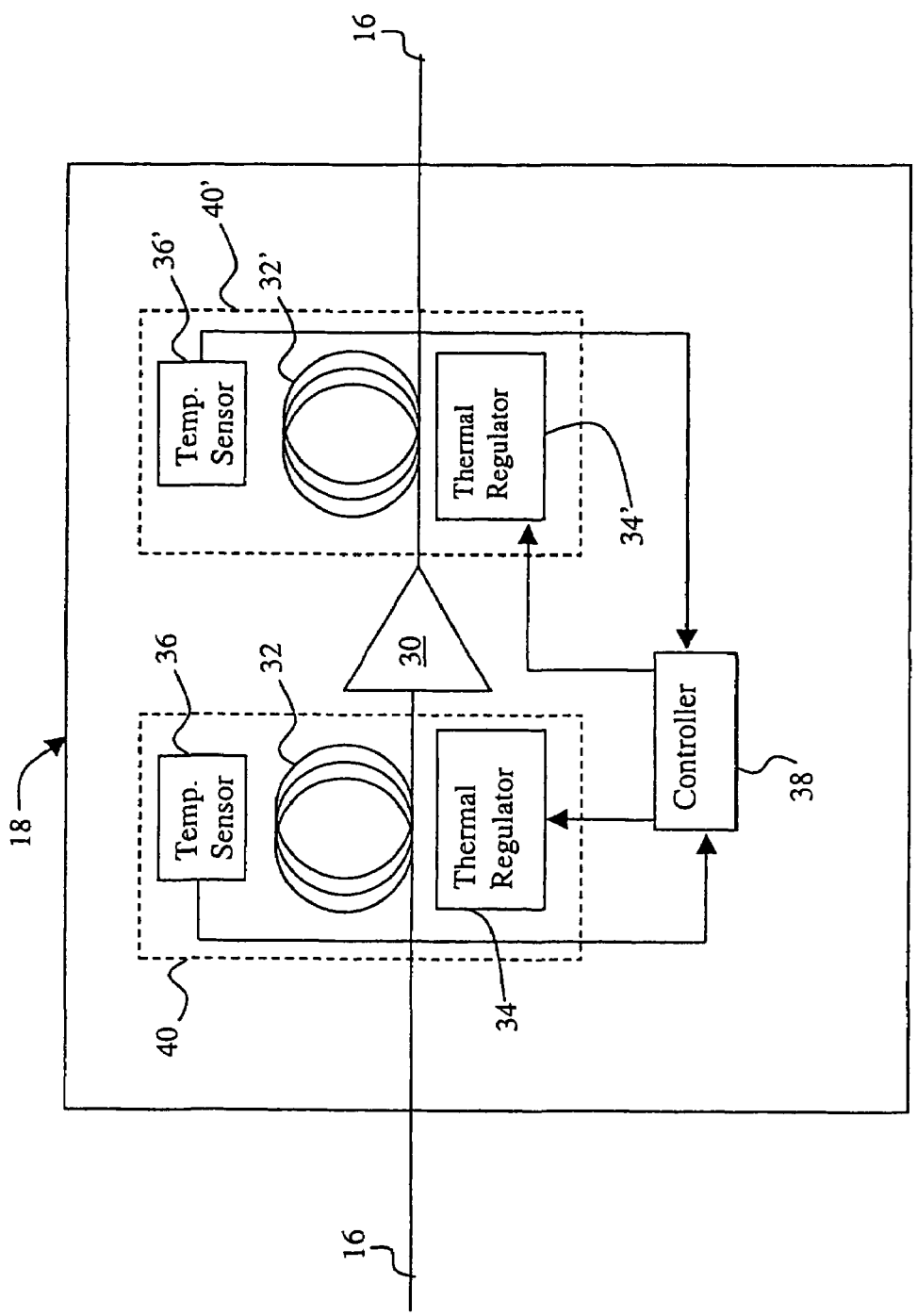
FIG. 2 is a block diagram of a dispersion compensation module in an embodiment of the invention.

Each dispersion compensation module 18 is designed to counteract dispersion occurring on a length of transmission fiber 16. As shown in FIG. 2, each dispersion compensation module 18 includes dispersion compensating fiber 32. The dispersion compensating fiber (DCF) 32 may be implemented using a variety of different types of fiber. The dispersion compensating fiber 32 may also be implemented using high order mode dispersion compensating fiber, such as that disclosed in U.S. Pat. No. 5,261,016, along with the appropriate mode converters. A thermal regulator 34 is placed proximate to and in thermal contact with the dispersion compensating fiber 32 to control the temperature of the dispersion compensating fiber. The thermal regulator 34 may be implemented using conventional devices such as a peltier heater/cooler, a resistive heater or a refrigerant based heater/cooler.

A temperature sensor 36 is placed proximate to and in thermal contact with the dispersion compensating fiber 32 and generates a temperature signal that is used by a controller 38 to adjust the thermal regulator 34. The controller 38 may be implemented using known control devices such as microprocessor-based controllers. The controller 38 may be set to maintain the dispersion compensating fiber 32 at a predetermined temperature or within a predetermined temperature range. When the temperature signal indicates that the dispersion compensating fiber 32 is not at the appropriate temperature, the controller 38 provides an appropriate control signal to thermal regulator 34 to increase or decrease the temperature of the dispersion compensating fiber 32 accordingly.

The dispersion compensating fiber 32, thermal regulator 34 and temperature sensor 36 may be encased in a thermally conductive medium 40 such as a gel-like potting compound with proper viscous and thermal conductivity properties. Embedding the dispersion compensating fiber 32 in a gel-like compound provides thermal stability and enhanced thermal conductivity and controls micro-bend losses.

Controller 38 may also regulate temperature of additional sections of dispersion compensating fiber 32' through thermal regulator 34' and temperature sensor 36' encased in thermally conductive medium 40'. Alternatively, separate controllers may be used for each section of dispersion compensating fiber. If multiple sections of dispersion compensating fiber are used in the dispersion compensation module 18, an optional amplifier 30 may be placed in optical communication with dispersion compensating fiber 32 and dispersion compensating fiber 32'. Additional amplifiers (e.g., conventional span amplifiers) may be placed along the communications path in optical communication with the dispersion compensation modules 18.

In operation, the controller 38 maintains the temperature of the dispersion compensating fibers 32 and 32' at a predetermined set point or within a temperature range. Thus, if the ambient temperature surrounding the dispersion compensation module 18 should fall, the controller 38 maintains the temperature of the dispersion compensating fibers 32 and 32' accordingly. To adjust the amount of dispersion provided by the dispersion compensating fibers 32 and 32', the controller 38 is updated to a new temperature set point or range. Update of the controller 38 may be made manually by field service personnel or automatically as described herein with reference to FIGS. 4 and 5.

Figure 3:
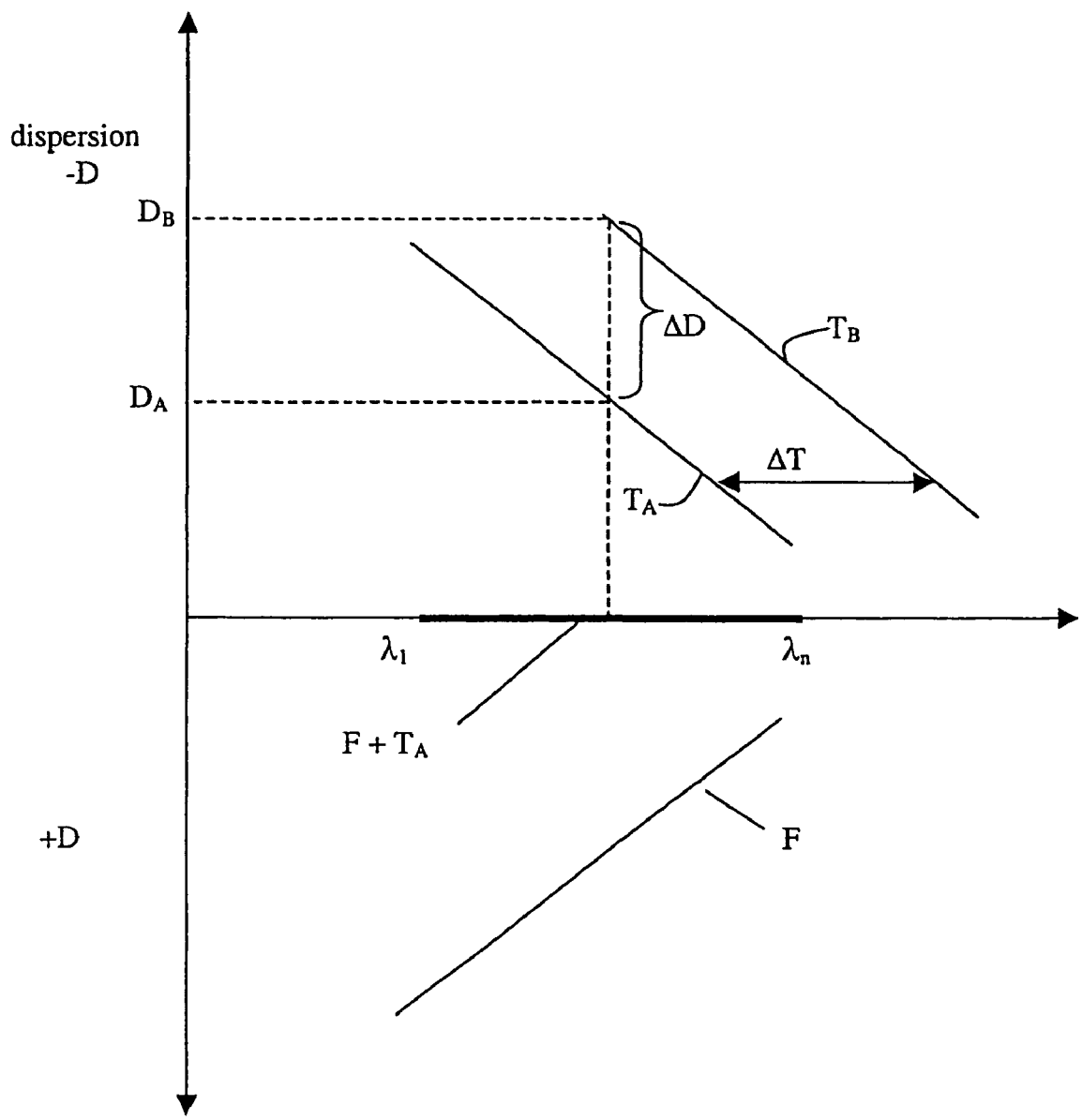
FIG. 3 is plot of dispersion coefficient versus wavelength for dispersion compensating fiber at different temperatures.

FIG. 3 illustrates four curves of dispersion coefficient D as a function of wavelength. Each curve can also be referred to as a dispersion characteristic. Two of the dispersion characteristics are labeled $T_A$ and $T_B$, and correspond to the dispersion characteristic of conventional DCF at temperatures $T_A$ and $T_B$, respectively. The third dispersion characteristic, labeled F, is associated with conventional transmission fiber. Typically, in order to achieve suitable dispersion compensation over a desired range of wavelengths, a sum of the dispersion characteristics of the transmission fiber and the DCF should be substantially equal to zero for each wavelength within the range. As seen in FIG. 3, the accumulated dispersion of optical signals propagating through the DCF at temperature $T_A$ and the transmission fiber, i.e., the net dispersion characteristic associated with these two fibers, is zero over a given range of wavelengths $\lambda_1$ to $\lambda_n$ (see the fourth curve labeled F+$T_A$). If the temperature of the DCF changes, for example, to temperature $T_B$, the net dispersion of characteristics F and $T_B$ is not equal to zero substantially throughout the desired range. Accordingly, the overall dispersion associated with those signals having an inadequate amount of compensation can accumulate to an unacceptably high level.

Consistent with the present invention, however, the temperature of the DCF can be appropriately adjusted, using a thermal regulator, to temperature $T_A$ such that the sum of the characteristics of the DCF and transmission fibers, characteristic F+$T_A$, is substantially zero over the desired range of wavelengths to thereby adequately compensate these channels.

Altering temperature of the dispersion compensating fiber typically causes a shift of the zero-dispersion wavelength ($\alpha\lambda_o$) of approximately 0.03 nm/deg C., with little measurable change in the dispersion slope as shown in FIG. 3. This causes the dispersion coefficient D at wavelength $\lambda_1$, for example, to change from $D_B$ to $D_A$ to provide a $\Delta D$ due to non-zero slope of the dispersion characteristic curve. As noted above, by compensating temperature, the dispersion characteristic of the dispersion compensating fiber 32 can be tuned to substantially cancel the dispersion of the transmission fiber 16 and yield a net characteristic $F+T_A$ of substantially zero over a desired range of wavelengths.

For purposes of illustration, a numerical example is provided. In this example, the transmission fiber 16 (e.g., NDSF) has a dispersion of $D_{NDSF}$~16.5 ps/nm·km, and a dispersion slope $D'_{NDSF}$~0.06 ps/nm²·km. The dispersion compensating fiber 32 is scaled relative to the transmission fiber 16 by a factor of ~5 such that the dispersion compensating fiber has a dispersion $D_{DCF}$~-82.5 ps/nm·km, and dispersion slope $D'_{DCF}$~-0.3 ps/nm²·km. Given such scaling, the physical length of dispersion compensating fiber 32 is ~5 times smaller than the length of transmission fiber 16 that it compensates.

Based on the above values, the change in dispersion as a function of temperature is $$\Delta D = \Delta \lambda_0 \cdot D'_{DCF} = 0.03 \cdot (-0.3) = -0.009 \frac{ps}{nm \cdot km \cdot {}^\circ C.}$$

Considering that the total dispersion compensating fiber dispersion scales linearly with transmission fiber dispersion, the percentage of total transmission dispersion that thermal tuning can compensate is:

$$K = \frac{\Delta \lambda_0 \cdot D'_{DCF}}{D_{NDSF}} = -0.0545 \frac{\%}{{}^\circ C.}$$

If the temperature regulator 34 provides a 50° C. thermal tunability range, the equivalent dispersion compensation range is K·50=~2.73% of the transmission fiber 16.

Figure 4:
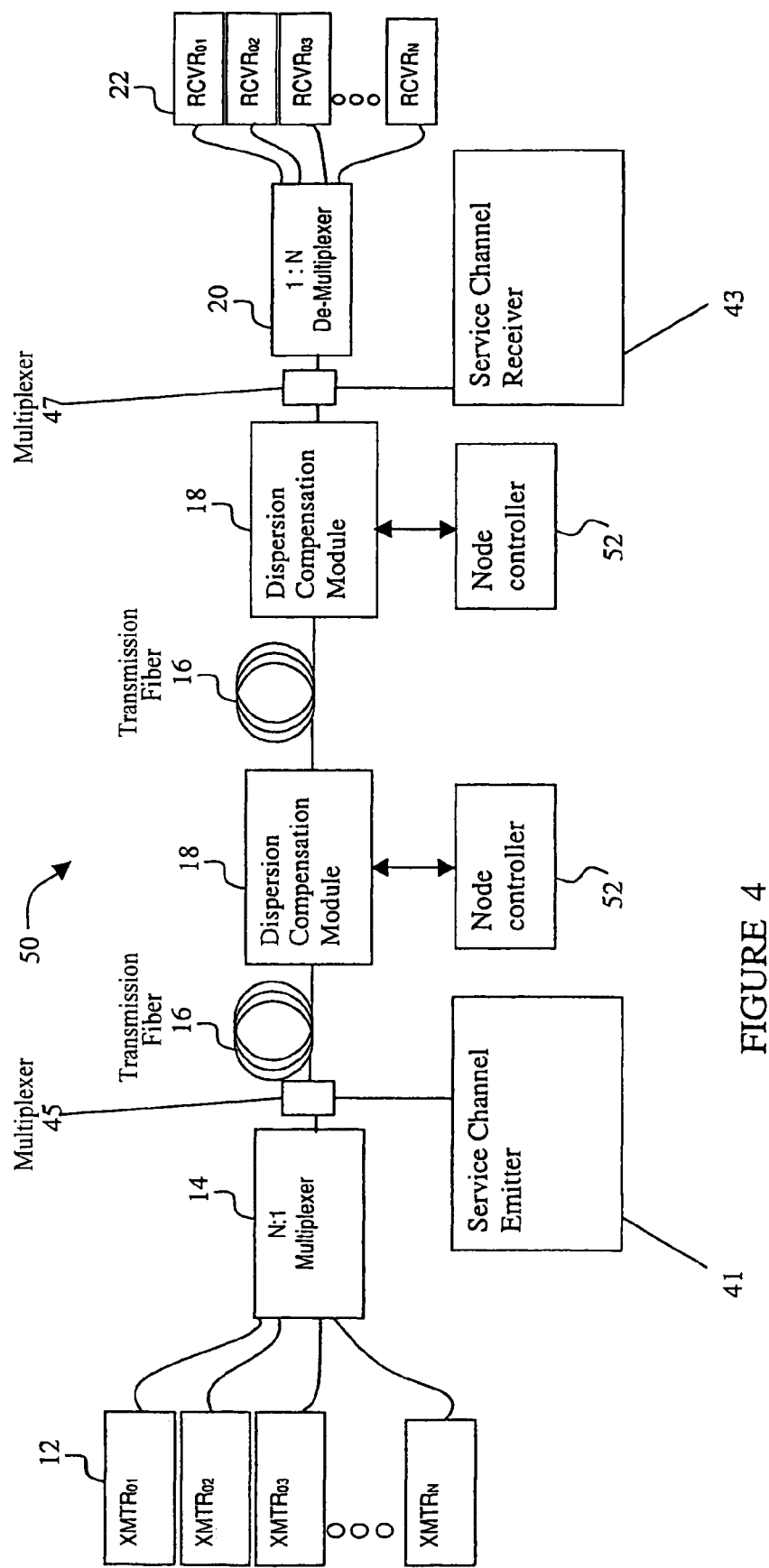
FIG. 4 block diagram of a communications system in an alternate embodiment of the invention.

FIG. 4 is a block diagram of an optical communications network 50 in an exemplary embodiment of the invention. Communications network 50 is similar to communications network 10, but provides for adjustment of the dispersion characteristic of the dispersion compensating fiber 32 in accordance with information carried by an optical service channel. In particular, control information can be used to modulate an optical service channel, which is at a wavelength different than the wavelengths output from transmitters 12.

As further shown in FIG. 4, a service channel emitter 41 supplies a service channel to a coupler or wavelength division multiplexer 45 that combines the service channel onto fiber 16. The service channel propagates along fiber 16 with the optical signals output from transmitters 12 to dispersion compensation module 18, shown in greater detail in FIG. 5. Module 18 includes a wavelength selective coupler 61 to separate the service channel from the other optical signals carried by fiber 16. A control circuit including the following first, second and third circuits controls the temperature of the DCF in accordance with information carried by the service channel optical signals. The first circuit, service channel receiver 54, senses the service channel signals, converts them to electrical sense signals, and supplies the sense signals to the second circuit, processor 56, the service channel receiver 54 and the processor 56 typically being housed in node controller 52. In response to the sense signals, processor 56 outputs a temperature signal indicative of a desired temperature for DCF 32 to a third circuit, including controller 38 and thermal regulator circuit 34, which, in turn, adjusts the temperature of DCF 32 accordingly. Optionally, controller 38 further outputs appropriate signal to thermal regulator 34, for controlling the temperature of DCF 32' in accordance with additional information carried by the service channel optical signals.

Temperature information, for example, can be fed by temperature sensors 36 and 36' to processor 56 via controller 38. Processor 56, in turn, can supply that information properly formatted, for example, as well as other monitoring, diagnostic and/or control information to a service channel emitter 65. The information can be used to modulate further service channel signals, often at the service channel wavelength, output from service channel emitter 65. The additional service channel optical signals are next combined onto fiber 16 and copropagate in a direction toward receivers 22. Additional dispersion compensation modules coupled to fiber 16 function in a similar manner as the module described above to control the temperatures of the DCFs contained therein in accordance with information carried by the service channel.

Alternatively, receivers 22 can be configured to monitor signal quality on at least one transmission channel provided on transmission fiber 16 using conventional techniques. These techniques include monitoring digital error rate, monitoring the time-domain shape of the eye pattern, measuring the frequency-domain shape of the transmitted signal spectrum, etc. The receivers 22 may include error detection components or utilize external error detection components such as a network analyzer.

Based on the signal quality on one or more transmission channels, one or more receivers generates an error signal indicative of signal quality. Due to the linear dispersion characteristic of the transmission fiber 16, signal quality may be detected for a single wavelength and corrections implemented by dispersion compensation modules 18 will affect all wavelengths due to the shift of the dispersion characteristic as shown in FIG. 3.

Figure 7:
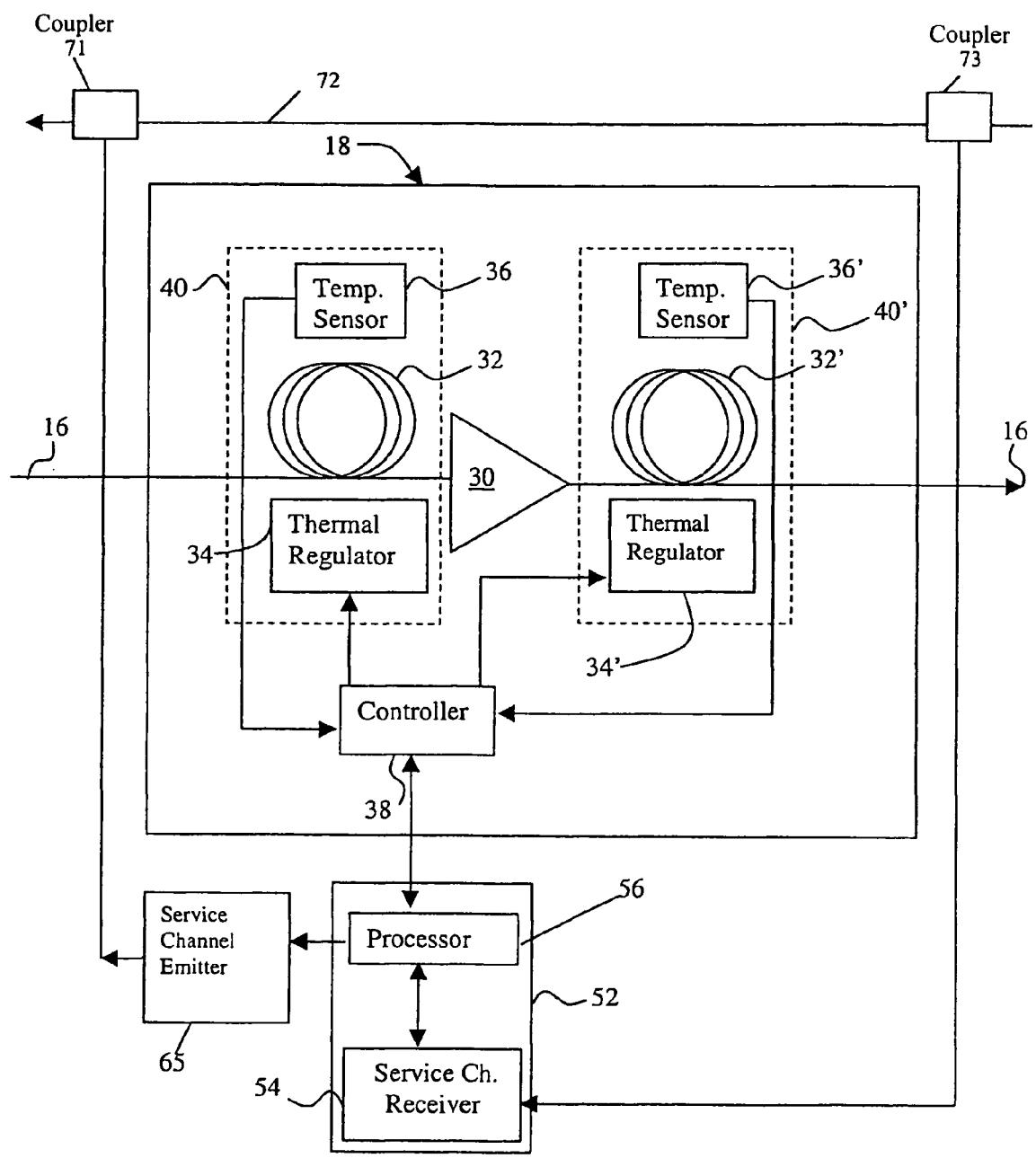
FIG. 7 illustrates a block diagram of a dispersion compensation module and a node controller in a further embodiment of the present invention.

The error signal is communicated to node controllers 52 preferably through a service channel transmitted by a service channel emitter (similar to service channel emitter 41) on an alternative optical path or fiber 72, shown in FIG. 7. Coupler 73 separates the service channel from any other optical signals present on the alternative optical path or fiber 72 and supplies them to an optical service channel receiver in much the same fashion as that described above in connection with FIG. 5. Information or data carried by the service channel is then used to adjust the temperature of DCFs 32 and 32' in a manner similar to that described above. Information output from processor 56 in FIG. 7 is used by service channel emitter 65 to generate additional service channel signals, which are combined onto the alternative optical path or fiber 72 by coupler 71 and propagate in the direction indicated by the arrow extending from coupler 71 in FIG. 7.

Figure 5:
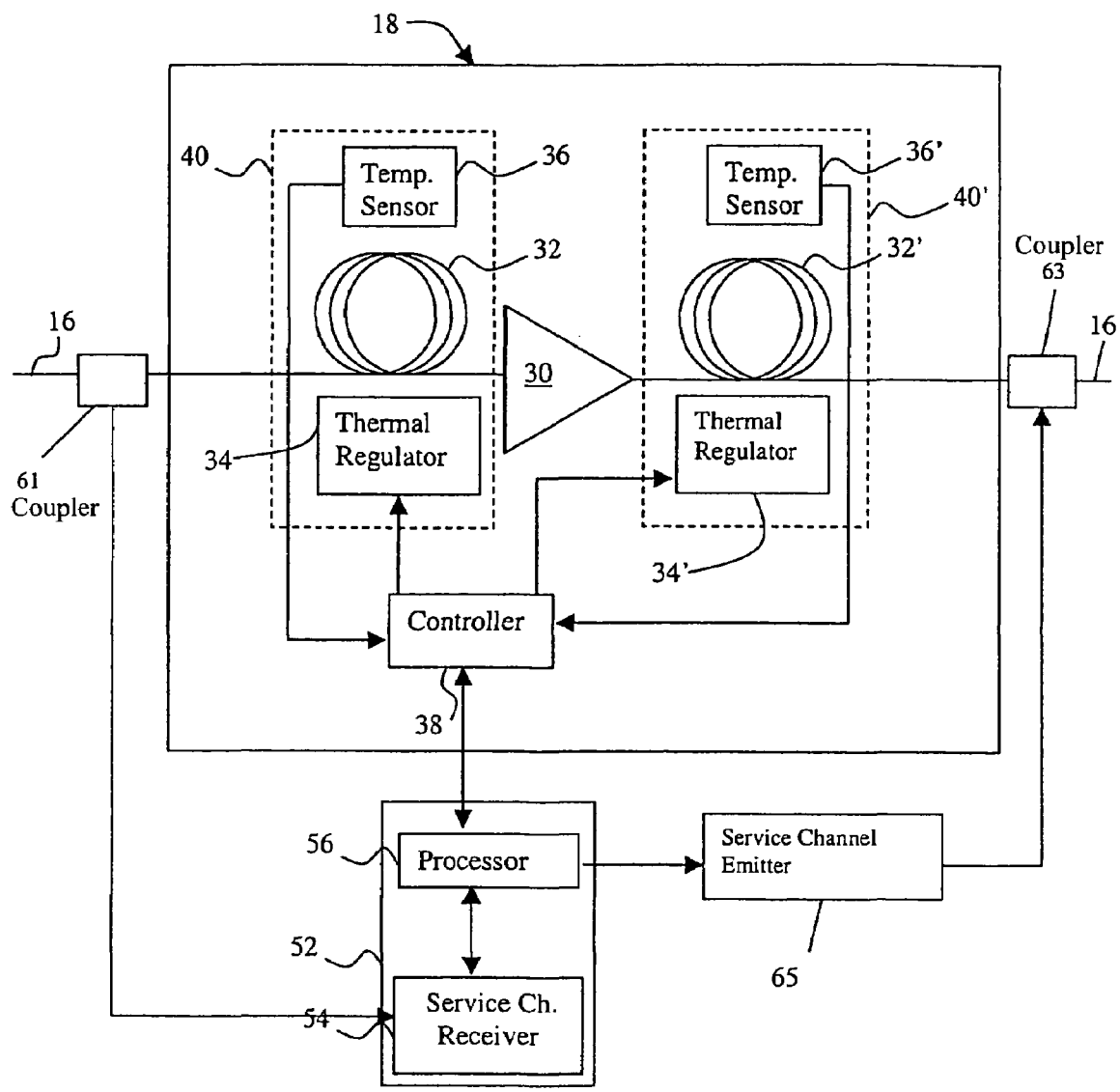
FIG. 5 is a block diagram of a dispersion compensation module and a node controller in an alternate embodiment of the invention.

In both FIGS. 5 and 7, the use of multiple dispersion compensating fibers 32 and 32' in the dispersion compensation module 18 and multiple dispersion compensation modules 18 provides for load sharing of dispersion compensation. Due to the linear nature of the dispersion slope of the dispersion compensating fiber and the additive nature of dispersion compensation, dispersion compensation can be shared across multiple dispersion compensating fibers or dispersion compensation modules. For example, the error signal from the receiver 22 may indicate that additional negative dispersion is needed requiring an increase of 10° C. along a length of one dispersion compensating fiber 32.

Assuming each dispersion compensating fiber 32 and 32' has the same length, a single dispersion compensating fiber can increase temperature by 10° C. or two dispersion compensating fibers 32 and 32' can be equally increased in temperature by 5° C. to obtain the desired dispersion compensation. Controllers 38 in dispersion compensation modules 18 adjusts the amount of dispersion compensation provided by each dispersion compensating fiber by independently setting the temperature of each dispersion compensating fiber.

Independent control of each thermal regulator 34 and 34' allows for compensation for a failing thermal regulator. If thermal regulator 34 is defective, the temperature signal from temperature sensor 36 will continuously fail to match the temperature set point. The controller 38 detects this condition and adjusts the temperature of thermal controller 34' and dispersion compensating fiber 32' to compensate for degradation of thermal regulator 34. For example, the temperature of dispersion compensating fiber 32 may be consistently low despite attempts to raise the temperature through thermal regulator 34. In this scenario, the temperature of dispersion compensating fiber 32' is raised.

The node controllers 52 can also communicate with each other over the service channel and may distribute dispersion compensation load across multiple dispersion compensation modules 18. In the example above, each dispersion compensation module 18 could provide a 5° C. increase across one dispersion compensating fiber 32 to provide the requisite dispersion compensation. Thus, dispersion compensation load sharing can be performed on an intra-dispersion compensation module basis or an inter-dispersion compensation module basis.

Dispersion compensation load sharing may be implemented by designating one node controller as a master that receives the error signal and distributes appropriate commands to slave node controllers. In one embodiment, the master node controller divides the required dispersion compensation equally across all dispersion compensation modules. In an alternate embodiment, the master node controller polls slave node controllers to determine the ability of each dispersion compensation module to provide dispersion compensation. Each slave processor provides an availability signal to the master node controller indicating the ability to provide dispersion compensation. The availability signal may represent the available range of dispersion compensation (e.g., $D_{low}$ to $D_{high}$) that a dispersion compensation module can provide. For example, a dispersion compensation module may have both thermal regulators set at a maximum temperature. The slave node controller associated with that dispersion compensation module will indicate to the master node controller, through an availability signal, that no additional dispersion compensation can be provided.

Figure 6:
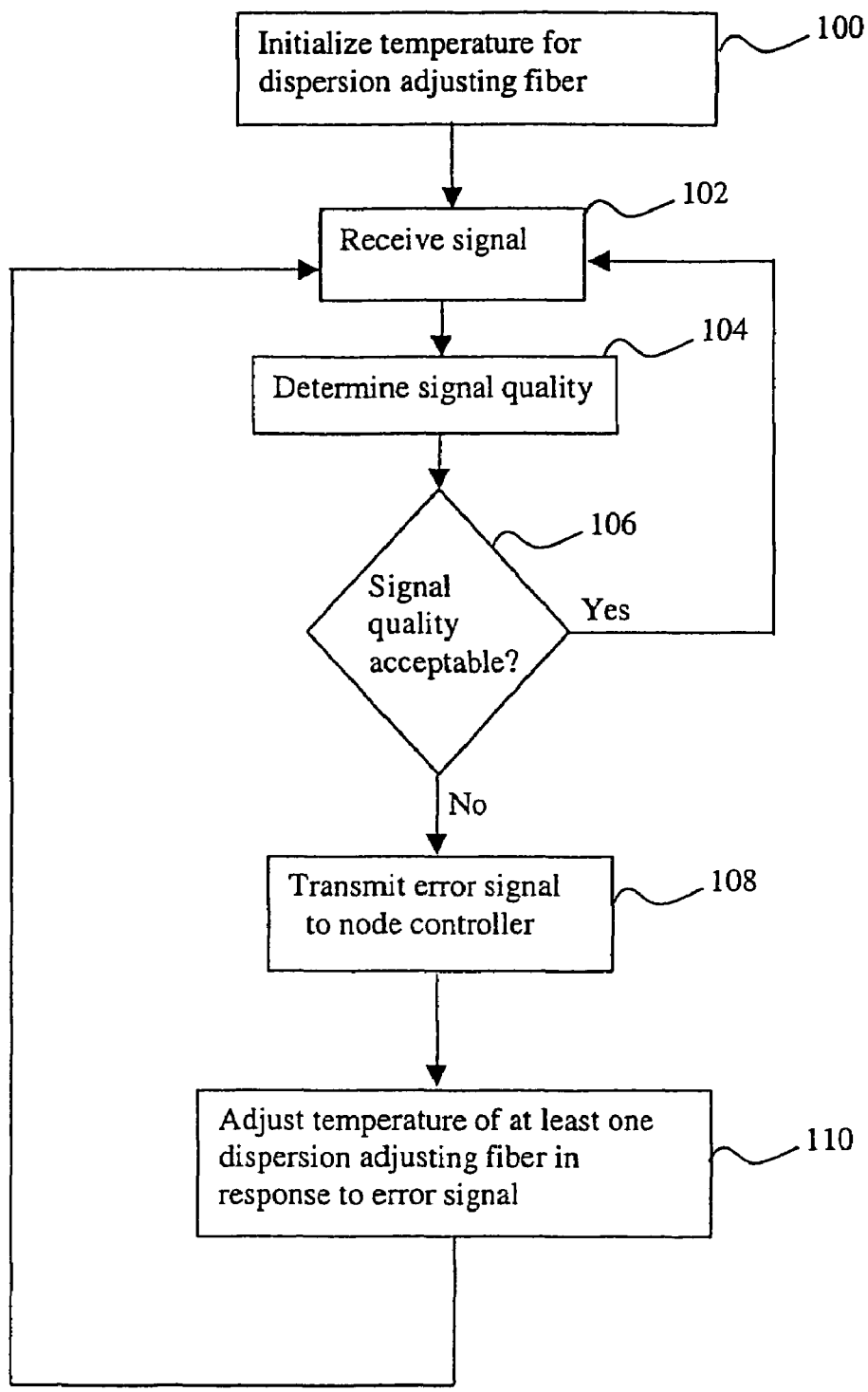
FIG. 6 is a flowchart of a process performed in the embodiment shown in FIG. 4.

FIG. 6 is a flowchart of a process for compensating dispersion compensation implemented by the system of FIG. 4. The process begins at step 100 where temperatures for each dispersion compensating fiber in the dispersion compensation modules 18 are initially set. This may be done by field personnel upon installation of the dispersion compensation module or remotely via the service channel. Once initialized, signals are received at receivers 22 as indicated at step 102. The receivers 22, or associated components such as a network analyzer, determine the signal quality of the received signals at step 104. At step 106, it is determined whether the signal quality is acceptable. If so, flow proceeds back to step 102 where the receivers 22 continue to receive signals. If the signal quality is unacceptable at step 106, flow proceeds to step 108 where an error signal is transmitted to the node controllers 52. In response to the error signal, the node controllers 52 provide control signals to the dispersion compensation modules 18 to adjust the temperature of the dispersion compensating fibers. As described above, the adjustment in temperature may be made in one dispersion compensating fiber or across multiple dispersion compensating fibers in multiple dispersion compensation modules. Once the temperature adjustment is made, flow proceeds to step 102 where the process repeats.

One source of dispersion variance along the optical transmission path is variance in the dispersion characteristic of the transmission fiber 16. Optical transmission fiber 16 may be routed through a variety of environmental conditions such as underground, underwater, in direct sunlight, etc. As environmental conditions change (e.g., the sun rising and setting, shifting ocean currents) the dispersion characteristic of the transmission fiber varies. The system and method described herein can accommodate for such changes and maintain optical communications at a high level of quality.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A communications network comprising:
   an optical transmitter emitting an optical signal at a first wavelength;
   an optical communication path optically coupled to said optical transmitter, said optical communication path being configured to carry said optical signal;
   a service channel emitter optically coupled to one of said optical communication path and an alternate optical communication path, said service channel emitter supplying a service channel optical signal including data representing signal quality or control information to said one of said optical communication path and said alternate optical communication path, said service channel optical signal being at a second wavelength different than said first wavelength;
   a dispersion compensating module optically coupled to said optical communication path, said dispersion compensating module having an associated dispersion characteristic; and
   a control circuit operatively coupled to said dispersion compensation module, said control circuit being configured to adjust a dispersion characteristic associated with said dispersion compensating module in response to said data carried by said service channel optical signal.

2. A communications network in accordance with claim 1, wherein said data carried by said service channel optical signal representing the signal quality or the control information is associated with said optical signal having said first wavelength.

3. A communications network in accordance with claim 1, further comprising:
   a plurality of additional optical transmitters optically coupled to said optical communication path, each of said additional optical transmitters emitting a respective one of a plurality of additional optical signals, each of said plurality of additional optical signals being at a respective one of a plurality of wavelengths, each of said plurality of wavelengths being different from said first and said second wavelengths, said dispersion characteristic being adjusted such that said optical signal and each of said plurality of optical signals has substantially the same dispersion.

4. A communications network in accordance with claim 3, wherein said dispersion is substantially equal to zero.

5. A communications network in accordance with claim 1, wherein said control circuit includes a thermal regulator coupled to said dispersion compensating module, said thermal regulator being configured to adjust a temperature of said dispersion compensating module.

6. A communications network in accordance with claim 1, wherein said control circuit further comprises:
  first circuitry configured to sense said service channel optical signal and generate a sense signal in response thereto, said sense signal carrying said data;
  second circuitry coupled to said first circuitry and being configured to output a temperature signal in response to said sense signal; and
  a thermal regulator coupled to said second circuitry, said thermal regulator compensating a temperature of a dispersion compensating fiber in response to said temperature signal to thereby adjust said dispersion characteristic.

7. A communications network in accordance with claim 5, wherein said dispersion compensating module is substantially encased in a thermally conductive medium.

8. A communications network in accordance with claim 1, wherein said dispersion compensating module is a first dispersion compensating module, said communication network further comprising:
  a second dispersion compensating module optically coupled to said optical communication path, said control circuit being configured to adjust a dispersion characteristic associated with said second dispersion compensating module in accordance with additional data carried by said service channel optical signal.

9. A communications network in accordance with claim 1, wherein said dispersion compensating module is a first dispersion compensating module having a first dispersion characteristic,
  wherein said control circuit is a master control circuit,
  the communications network further comprising:
  a second dispersion compensating module optically coupled to the optical communication path, said second dispersion compensating module having a second dispersion characteristic; and
  a slave control circuit operatively coupled to said second dispersion compensating module,
  said master control circuit generating a master control signal and a slave control signal in response to the data carried by the service channel optical signal,
  wherein the first and second dispersion characteristics of the first and second dispersion compensating modules are respectively adjusted in response to the master and slave control signals.

10. A communications network in accordance with claim 9, wherein the master and slave control signals substantially equally divide a total amount of dispersion to be compensated between said first and second dispersion compensating modules.

11. A communications network in accordance with claim 9,
  a plurality of said second dispersion compensating modules each having a respective dispersion characteristic, and
  a plurality of slave control circuits each of which is associated with a corresponding one of said second dispersion compensating modules.

12. A communications network in accordance with claim 11,
  said master control circuit polling each of said slave control circuits to determine the availability of the corresponding second dispersion compensating modules to compensate for dispersion,
  said master control circuit generates the master and slave control signals according to a determined availability of each of said second dispersion compensating modules and the data carried by the service channel optical signal.

13. A communications network comprising:
  an optical transmitter emitting an optical signal at a first wavelength;
  an optical communication path optically coupled to said optical transmitter, said optical communication path being configured to carry said optical signal;
  a service channel emitter optically coupled to one of said optical communication path and an alternate optical communication path, said service channel emitter supplying a service channel optical signal including data representing signal quality or control information to said one of said optical communication path and said alternate optical communication path, said service channel optical signal being at a second wavelength different than said first wavelength;
  a dispersion compensating module optically coupled to said optical communication path, said dispersion compensating module having an associated dispersion characteristic; and
  a control circuit operatively coupled to said dispersion compensation module, said control circuit being configured to adjust a dispersion characteristic associated with said dispersion compensating module in response to data carried by said service channel optical signal,
  wherein said control circuit is connected to said service channel emitter, and information output from said control circuit is used by said service channel emitter to generate an additional service channel optical signal which is supplied to said alternative optical communication path.

14. A communications network in accordance with claim 13, wherein said data carried by said service channel optical signal representing the signal quality or the control information supplied by said service channel emitter is associated with said optical signal having said first wavelength.

15. A communications network in accordance with claim 13, further comprising:
  a plurality of additional optical transmitters optically coupled to said optical communication path, each of said additional optical transmitters emitting a respective one of a plurality of additional optical signals, each of said plurality of additional optical signals being at a respective one of a plurality of wavelengths, each of said plurality of wavelengths being different from said first and said second wavelengths, said dispersion characteristic being adjusted such that said optical signal and each of said plurality of optical signals has substantially the same dispersion.

16. A communications network in accordance with claim 15, wherein said dispersion is substantially equal to zero.

17. A communications network in accordance with claim 13, wherein said control circuit includes a thermal regulator coupled to said dispersion compensating module, said thermal regulator being configured to adjust a temperature of said dispersion compensating module.

18. A communications network in accordance with claim 13, wherein said control circuit further comprises:
first circuitry configured to sense said service channel optical signal and generate a sense signal in response thereto, said sense signal carrying said data;
second circuitry coupled to said first circuitry and being configured to output a temperature signal in response to said sense signal; and
a thermal regulator coupled to said second circuitry, said thermal regulator compensating a temperature of a dispersion compensating fiber in response to said temperature signal to thereby adjust said dispersion characteristic.

19. A communications network in accordance with claim 13, wherein said dispersion compensating module is a first dispersion compensating module, said communication network further comprising:
a second dispersion compensating module optically coupled to said optical communication path, said control circuit being configured to adjust a dispersion characteristic associated with said second dispersion compensating module in accordance with additional data carried by said service channel optical signal.

20. A communications network in accordance with claim 13,
wherein said dispersion compensating module is a first dispersion compensating module having a first dispersion characteristic,
wherein said control circuit is a master control circuit,
the communications network further comprising:
a second dispersion compensating module optically coupled to the optical communication path, said second dispersion compensating module having a second dispersion characteristic; and
a slave control circuit operatively coupled to said second dispersion compensating module,
said master control circuit generating a master control signal and a slave control signal in response to the data carried by the service channel optical signal,
wherein the first and second dispersion characteristics of the first and second dispersion compensating modules are respectively adjusted in response to the master and slave control signals.

21. A communications network comprising:
an optical transmitter emitting an optical signal at a first wavelength;
an optical communication path optically coupled to said optical transmitter, said optical communication path being configured to carry said optical signal;
a service channel emitter optically coupled to one of said optical communication path and an alternate optical communication path, said service channel emitter supplying a service channel optical signal to said one of said optical communication path and said alternate optical communication path, said service channel optical signal being at a second wavelength different than said first wavelength;
a dispersion compensating module optically coupled to said optical communication path, said dispersion compensating module having an associated dispersion characteristic; and
a control circuit operatively coupled to said dispersion compensation module, said control circuit being configured to adjust a dispersion characteristic associated with said dispersion compensating module in response to data carried by said service channel optical signal, wherein said dispersion compensating module is a first dispersion compensating module having a first dispersion characteristic,
wherein said control circuit is a master control circuit,
the communications network further comprising:
a second dispersion compensating module optically coupled to the optical communication path, said second dispersion compensating module having a second dispersion characteristic; and
a slave control circuit operatively coupled to said second dispersion compensating module,
said master control circuit generating a master control signal and a slave control signal in response to the data carried by the service channel optical signal,
wherein the first and second dispersion characteristics of the first and second dispersion compensating modules are respectively adjusted in response to the master and slave control signals.

* * * * *